United States Patent Office 3,392,002
Patented July 9, 1968

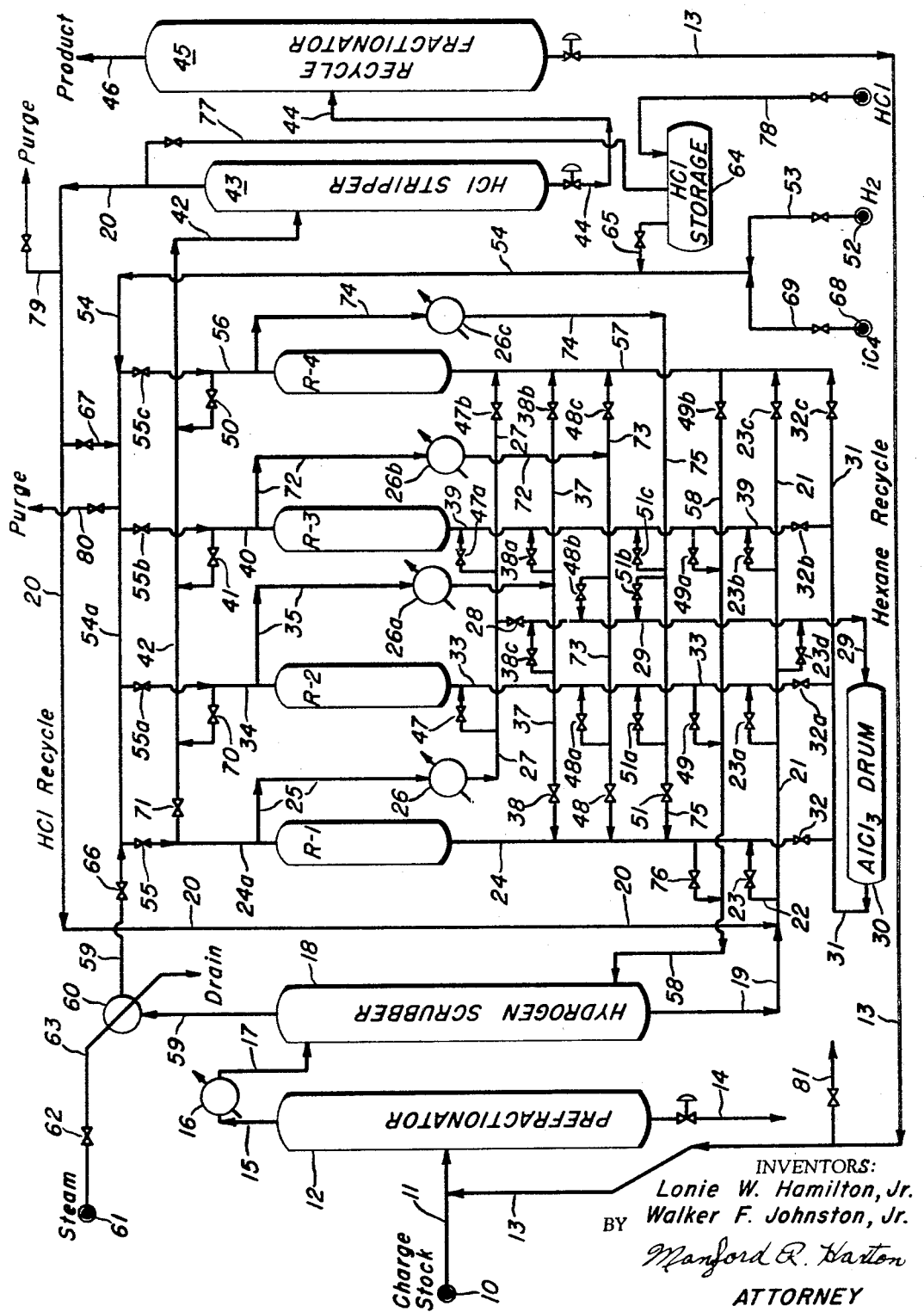

3,392,002
FIXED-BED CONTACTING SYSTEM
Lonie W. Hamilton, Jr., Hazelcrest, and Walker F. Johnston, Jr., Flossmoor, Ill., assignors to Standard Oil Company, Chicago, Ill., a corporation of Indiana
Filed June 29, 1964, Ser. No. 378,793
7 Claims. (Cl. 23—263)

ABSTRACT OF THE DISCLOSURE

An improved fixed-bed processing system including a plurality of catalyst containing reactors which are operationally interconnected so that they may be arranged in a series, any of the reactors occupying any position from first to last within the series. The reactors are also connected so that any of the reactors may be isolated from the series to permit regeneration of the catalyst therein. The reactors may be interconnected with one or more fractionating units. Although some of the reactors may be operatively connected in parallel, the scope of the invention is such that for a series connection of the reactors, at least a portion of the effluent from one reactor is passed to at least one other reactor with or without any intermediate treatment.

---

This invention relates to fixed-bed regenerative processes utilizing solid catalysts. More particularly the invention relates to apparatus for carrying out such processes.

This invention provides an improved fixed-bed catalyst contacting system comprising a plurality of reactors each adapted to contain catalyst, conduit and valve means for connecting said reactors in series so that each of said reactors can occupy any position from first to last in said series and each of said reactors can be isolated from said series for regeneration of the catalyst therein, conduit and valve means for introducing catalyst regeneration fluid to each reactor and conduit and valve means for withdrawing said fluid therefrom, inlet means for introducing charge material to the reactor first in said series, and outlet means for recovering effluent from the reactor last in said series.

Our invention contemplates that some of the reactors may also be connected in parallel, the requirement for connecting reactors in series being that at least a portion of the effluent from one reactor is passed into another reactor, with or without intermediate treatment of any kind or type, such as heating, cooling, separation, addition of other materials, etc.

Our apparatus finds particular application in petroleum hydrocarbon refining processes; for example, catalytic reforming, catalytic olefin polymerization, alkylation, isomerization, etc., however it is not limited thereto. For example, in multi-reactor catalytic reforming processes for converting low octane naphtha to high octane gasoline blending components, the catalyst in the tail reactor(s) ages more rapidly than the catalyst in the lead reactor(s) because of the higher average temperature and more frequent regeneration. Existing equipment for conducting multi-reactor catalytic reforming provides a "swing reactor" which may be used to replace other reactor(s) on process so that the other reactor(s) may be regenerated. But this equipment does not permit relocating of the catalyst into different positions along the process stream, e.g., from the tail position to the lead position without shutting down the unit and dumping the catalyst. Our invention provides the much-needed means by which this can be accomplished.

A preferred embodiment of our apparatus as used in a process for isomerizing mixed hexane feed is shown schematically in the drawing. This illustration is a recycle isomerization process for conversion of low octane hexane isomers into dimethyl butane, primarily neohexane (2,2-dimethylbutane), which can be used as a high octane gasoline blending component. The process is also suitable for isomerizing pentanes or mixed pentanes and hexanes. The fixed-bed reactors are manifolded with valves and piping so that each reactor may be isolated from the process stream for regeneration. The manifolding, which is described below, and which is exemplified in the drawing, is designed so that each reactor may be located in any position along the process stream. Also, any one or more of the reactors may be isolated from the process stream for regeneration of the catalyst contained therein by passing regeneration fluid therethrough. The reactors may be isolated for regeneration of the catalyst more often than others, if desired.

Turning now to the drawing, charge stock from source 10, which has been pretreated to reduce sulfur, olefin, and aromatic concentrations to acceptable levels, is charged via line 11 to prefractionator 12 along with any hexane recycle from line 13. A bottoms stream containing naphthenes not required as cracking inhibitor, any heptanes and heavier portion from the fresh feed, and a small quantity of hexanes are withdrawn via valved line 14. This bottoms stream can be reformed or blended directly into gasoline. The prefractionator overhead, which contains most of the hexane isomers and sufficient naphthenes to inhibit cracking in the isomerization section, is passed via line 15, through cooler 16 wherein the temperature of the overhead stream is reduced to about 50° F. The cooled feed stream is then passed via line 17 into the upper portion of a hydrogen scrubber 18. The feed stream flows downward through the hydrogen scrubber countercurrently to a rising hydrogen stream, scrubbing from the hydrogen stream any hydrocarbons contained therein which boil above butane. This hydrogen stream is used for regeneration as discussed below. The feed stream passes from the hydrogen scrubber through line 19, is joined by HCl recycle from line 20, and is passed to the reaction section.

For the purpose of illustration, a process employing four reactors is shown and flow through the reaction section will be discussed as though reaction R-4 is being regenerated, reactor R-1 is the next reactor to be regenerated and thus is in the first position, reactor R-2 is the freshly regenerated reactor and thus is in the second position, and as though reactor R-3 was regenerated prior to reactor R-2, following the last regeneration of reactor R-1, and thus reactor R-3 occupies the third and last position in the series of reactors on process. The combined fresh feed-recycle HCl stream is passed into the feed manifold 21, thence through line 22. Valve 23 is open and valves 23a, 23b, 23c, and 23d are closed. The process stream passes upwardly through line 4 to reactor R-1, leaving through lines 24a and 25 into cooler 26 wherein the exothermic heat of reactor is removed. The cooled reactor R-1 effluent then passes into R-1 effluent manifold line 27, thence through valve 28 into aluminum chloride drum inlet line 29. The process stream passes through the aluminum chloride drum 30 into the aluminum chloride drum outlet manifold 31, thence through valve 32a into reactor R-2 inlet line 33 and thence into reactor R-2. The process stream then flows from reactor R-2 via lines 34 and 35 through cooler 26a into reactor R-2 outlet manifold line 37, valve 38a and reactor R-3 inlet line 39 into reactor R-3. The process stream is passed from reactor R-3 via line 40, and valve 41 into reaction section outlet manifold line 42, thence into HCl stripper 43. HCl is stripped from the reaction section effluent and is recycled via line 20 to reaction section inlet line 21. HCl-free effluent is then passed via valved line 44 into the recycle fractionator 45 from which dimethylbutane product is removed via line 46. The hexane recycle stream removed from the bottom of the recycle fractionator contains diisopropyl, methylpentanes, normal hexane and cycloparaffins as well as a trace of $C_7$-plus material. This bottoms stream is recycled via valved line 13 to prefractionator feed line 11, or if desired, some or all of the bottoms stream may be withdrawn as product from line 13 via valved line 81.

Reactor R-4 is isolated from the process stream for regeneration by closed valves 47b, 38b, 48c, 23c, 32c, 50, 51, 51a, 51b, and 51c. Hydrogen from source 52 is introduced to reactor R-4 via valved line 53, line 54, hydrogen inlet manifold 54a, valve 55c and line 56. Hydrocarbon is purged from reactor R-4 through line 57, valve 49b and line 58 into the hydrogen scrubber 18. The hydrocarbon from reactor R-4 joins the feed stream in the hydrogen scrubber 18 and enters the reaction section via lines 19 and 21. Alternatively, a surge drum may be provided into which reactor R-4, or any other reactor, may be drained prior to regeneration, and from which the reactor may be refilled prior to being returned to process. The use of such a surge drum will prevent upsetting the operation of the HCl stripper by intermittent variation in load when a reactor is drained or refilled. Scrubbed hydrogen passes from the hydrogen scrubber via line 59 through steam heater 60 and is recycled by a compressor (not shown) into line 54a and into reactor R-4 via valve 55c and line 56. The recycle hydrogen stream is heated by introducing steam from source 61 through valve 62 and line 63 into the steam heater 60. The hot recycle hydrogen stream in turn heats the catalyst in reactor R-4 to the preferred regeneration temperature of about 250–300° F. When the catalyst in reactor R-4 reaches the desired temperature, steam valve 62 is closed and the hydrogen flow is stopped by stopping the recycle compressor and closing valves 55c and 49b. The hot catalyst is allowed to stand in the presence of hydrogen under pressure for a time sufficient to complete regeneration of the catalyst. If desired a small amount of HCl may be present with the hydrogen. Alternatively isobutane from source 68 may be introduced with the hydrogen via valved line 69 and line 54 to aid in removing olefinic contaminants from the catalyst by alkylating them. We have found it best not to include HCl and isobutane simultaneously. The time required for the regeneration is normally in the range of about 6 to 72 hours. After the catalyst regeneration is complete, valves 55c and 49b are again opened, the recycle compressor started and the catalyst cooled to about 100–150° F. by recycling cool hydrogen via lines 59, 54a, 56, 57, and 58. Although not necessary, it is preferred that the recycle hydrogen used for cooling the catalyst contain a small amount of HCl. The HCl can be introduced into the recycle hydrogen stream from HCl storage drum 64 via valved line 65 and line 54 into the hydrogen line 54a. After the catalyst in reactor R-4 is cooled to the desired temperature the reactor is depressured by stopping the recycle hydrogen compressor, closing valve 55c and releasing the hydrogen from the reactor via valve 49b and line 58 into the hydrogen scrubber and then through lines 59, 54a and valved line 80 to vent. Valve 66 is then closed and the reactor is pressured to about 150–250 p.s.i. with HCl from recycle line 20 via valved line 67. The catalyst in reactor R-4 is allowed to stand in the presence of HCl under pressure for a time sufficient to react essentially completely the aluminum chloride-alumina catalyst with HCl. A time of 5–15 hours, more or less, is normally sufficient to complete this reaction. When the HCl reaction is completed, valved line 67 is closed and the reactor is again depressured via line 57 valve 49b and line 58 into hydrogen scrubber 18 where the HCl is absorbed in reaction section feed. Valve 49b is then closed and the reactor R-4 is then filled with liquid by opening valves 48c and 50.

When the reactor is filled with liquid, valves 48c and 50 are closed and then R-4 is put on stream in the second position preceded by the saturator, R-3 is moved to the first position, R-2 is changed to the last position and R-1 is removed for regeneration by opening valves 23b, 48b, 51a, 32c, and 70, and closing valves 23, 28, 32a, 38a and 41. Feed then flows from the bottom of the hydrogen scrubber 18 via lines 19 and 21 into reactor R-3 via valve 23b and line 39. The process stream then is passed via lines 40 and 72, valve 48b and line 29 into the $AlCl_3$ drum 30, thence via line 31, valve 32c and line 57 into reactor R-4, thence from reactor R-4 via lines 56 and 74 through cooler 26c into reactor R-2 via line 75, valve 51a and line 33. Effluent from R-2 flows via line 34, valve 70 and line 42 into the HCl stripper 43. Reactor R-1 is thus isolated from the process stream by closed valves 38, 48, 51, 76, 23, 32, 71, 55, 47, 47a, 47b, and 28. Reactor R-1 is then regenerated.

As has been pointed out above, HCl is released from the catalyst during the heating step of the regeneration sequence. If it is desired to prevent the HCl concentration from building up excessively in the process stream during the time a reactor is undergoing hydrogen treatment, HCl may be withdrawn from the system via valved line 77 into HCl storage drum 64. Make-up HCl is added to HCl storage drum 64 via valved line 78. If contaminants build up excessively in the HCl recycle stream a portion of this stream can be purged from the system via valved line 79. Likewise hydrogen can be purged from the system via valved line 80.

While our invention has been described herein as being employed in a particular process utilizing a particular regeneration sequence and order of reactors on stream, it is to be understood that other processes utilizing other sequences and orders may be carried out successfully in our apparatus. While our invention has been described as applied to a particular process system, various alternatives, arrangements and designs will be apparent from the above description to those skilled in the art and are within the spirit and scope of our invention.

Having thus described our invention we claim:

1. An improved fixed-bed catalyst contacting system comprising:
   (a) a plurality of reactors each adapted to contain catalyst;
   (b) distribution means for connecting said reactors in series to permit each of said reactors to occupy any position from first to last within said series, and to permit any of said reactors to be isolated from said series for regeneration of the catalyst therein, said distribution means comprising conduit means extending from each of said reactors to all other reactors in said system includable in said series, said conduit means having a valved connection to each of said other reactors;
   (c) conduit and valve means for introducing catalyst regeneration fluid to each reactor;
   (d) conduit and valve means for withdrawing said fluid from each reactor;
   (e) inlet means for introducing charge material to the reactor first in said series; and
   (f) outlet means for recovering effluent from the reactor last in said series.

2. An improved fixed-bed processing system comprising:
   (a) fractionator means adapted to separate a feed stream into a lower-boiling overhead fraction and a higher-boiling bottoms fraction, said fractionator means provided with an inlet for introducing said feed stream into said fractionator means, a lower outlet for withdrawing said bottoms fraction from the lower portion of said fractionator means, and an upper outlet for withdrawing said overhead fraction from the upper portion of said fractionator means;
   (b) a plurality of reactors each adapted to contain catalyst;
   (c) distribution means for connecting said reactors in a series to permit each of said reactors to occupy any position from first to last within said series and to permit any of said reactors to be isolated from said series for regeneration of the catalyst therein, said distribution means comprising conduit means extending from each of said reactors to all other reactors in said system includable in said series, said conduit means having a valved connection to each of said other reactors;

(d) reactor inlet means for introducing charge material to the reactor first in said series;

(e) conduit means for receiving said first overhead fraction from said fractionator and introducing said overhead fraction into said reactor inlet means;

(f) reactor outlet means for recovering effluent from the reactor last in said series;

(g) conduit and valve means for introducing catalyst regeneration fluid to each reactor; and (h) conduit and valve means for withdrawing said fluid therefrom.

3. An improved fixed-bed processing system comprising:

(a) a plurality of reactors each adapted to contain catalyst;

(b) distribution means for connecting said reactors in a series to permit each of said reactors to occupy any position from first to last within said series and to permit any of said reactors to be isolated from said series for regeneration of the catalyst therein, said distribution means comprising conduit means extending from each of said reactors to all other reactors in said system includable in said series, said conduit means having a valved connection to each of said other reactors;

(c) reactor inlet means for introducing charge material to the reactor first in said series;

(d) reactor outlet means for recovering effluent from the reactor last in said series;

(e) conduit and valve means for introducing catalyst regeneration fluid to each reactor;

(f) conduit and valve means for withdrawing said fluid therefrom;

(g) fractionator means adapted to remove lower-boiling compounds from said effluent, said fractionator being provided with an inlet, an upper outlet, and a lower outlet;

(h) conduit means for receiving said effluent from said reactor outlet means and introducing said effluent into said fractionator inlet;

(i) conduit means for transferring said lower-boiling compounds from said upper outlet into said reactor inlet; and (j) means for recovering product from said fractionator lower outlet.

4. An improved fixed-bed processing system comprising:

(a) a plurality of reactors each adapted to contain catalyst;

(b) distribution means for connecting said reactors in a series to permit each of said reactors to occupy any position from first to last within said series and to permit any of said reactors to be isolated from said series for regeneration of the catalyst therein, said distribution means comprising conduit means extending from each of said reactors to all other reactors in said system includable in said series, said conduit means having a valved connection to each of said other reactors;

(c) reactor inlet means for introducing charge material to the reactor first in said series;

(d) reactor outlet means for recovering effluent from the reactor last in said series;

(e) conduit and valve means for introducing catalyst regeneration fluid to each reactor;

(f) conduit and valve means for withdrawing said fluid therefrom;

(g) first fractionator means adapted to remove lower-boiling compounds from said effluent, said first fractionator means being provided with a first fractionator inlet, a first fractionator upper outlet, and a first fractionator lower outlet;

(h) conduit means for receiving said effluent from said reactor outlet means and introducing said effluent into said first fractionator inlet;

(i) conduit means for transferring said lower-boiling compounds from said upper outlet into said reactor inlet means;

(j) second fractionator means adapted to separate hydrocarbons into a lower-boiling overhead fraction and a higher-boiling bottoms fraction, said second fractionator means being provided with a second fractionator inlet, a second fractionator lower outlet, and a second fractionator upper outlet;

(k) conduit means for receiving fluid from said first fractionator lower outlet and introducing said fluid into said second fractionator inlet;

(l) means for receiving first product from said second fractionator lower outlet; and (m) means for recovering second product from said second fractionator upper outlet.

5. An improved fixed-bed system for processing a feed stream, said system comprising:

(a) first fractionator means adapted to separate said feed stream into a lower-boiling overhead fraction and a higher-boiling bottoms fraction, said first fractionator means provided with a first fractionator inlet for introducing said feed stream into said first fractionator means, a first fractionator lower outlet for withdrawing said bottoms fraction from the lower portion of said first fractionator upper outlet for withdrawing said overhead fraction from the upper portion of said first fractionator means;

(b) a plurality of reactors each adapted to contain catalyst;

(c) distribution means for connecting said reactors in a series to permit each of said reactors to occupy any position from first to last within said series and to permit any of said reactors to be isolated from said series for regeneration of the catalyst therein, said distribution means comprising conduit means extending from each of said reactors to all other reactors in said system includable in said series, said conduit means having a valved connection to each of said other reactors;

(d) reactor inlet means for introducing charge material to the reactor first in said series;

(e) conduit means for receiving said overhead fraction from said first fractionator and introducing said overhead fraction into said reactor inlet means;

(f) reactor outlet means for recovering effluent from the reactor last in said series;

(g) conduit and valve means for introducing catalyst regeneration fluid to each reactor;

(h) conduit and valve means for withdrawing said fluid therefrom;

(i) second fractionator means adapted to remove lower-boiling compounds from said effluent, said fractionator being provided with a second fractionator inlet, a second fractionator upper outlet, and a second fractionator lower outlet;

(j) conduit means for receiving said effluent from said reactor outlet means and introducing said effluent into said second fractionator inlet;

(k) conduit means for transferring said lower-boiling compounds from said upper outlet into said reactor inlet means; and (l) means for recovering product from said second fractionator lower outlet.

6. An improved fixed-bed system for processing a feed stream, said system comprising:
  (a) first fractionator means adapted to separate said feed stream into a lower-boiling overhead fraction and a higher-boiling bottoms fraction, said first fractionator provided with a first fractionator inlet for introducing said feed stream into said first fractionator means, a first fractionator lower outlet for withdrawing said bottoms fraction from the lower portion of said first fractionator means, and a first fractionator upper outlet for withdrawing said overhead fraction from the upper portion of said first fractionator means;
  (b) a plurality of reactors each adapted to contain catalyst;
  (c) distribution means for connecting said reactors in a series to permit each of said reactors to occupy any position from first to last within said series and to permit any of said reactors to be isolated from said series for regeneration of the catalyst therein, said distribution means comprising conduit means extending from each of said reactors to all other reactors in said system includable in said series, said conduit means having a valved connection to each of said other reactors;
  (d) reactor inlet means for introducing charge material to the reactor first in said series;
  (e) conduit means for receiving said overhead fraction from said first fractionator and introducing said overhead fraction into said reactor inlet means;
  (f) reactor outlet means for recovering effluent from the reactor last in said series;
  (g) conduit and valve means for introducing catalyst regeneration fluid to each reactor;
  (h) conduit and valve means for withdrawing said fluid therefrom;
  (i) second fractionator means adapted to remove lower-boiling compounds from said effluent, said second fractionator being provided with a second fractionator inlet, a second fractionator upper outlet and a second fractionator lower outlet;
  (j) conduit means for recovering said effluent from said reactor outlet means and introducing said effluent into said second fractionator inlet;
  (k) conduit means for transferring said lower-boiling compounds from said second fractionator upper outlet into said reactor inlet means;
  (l) third fractionator means adapted to separate compounds into a lower-boiling overhead fraction and a higher-boiling bottoms fraction, said third fractionator means provided with a third fractionator inlet, a third fractionator lower outlet, and a third fractionator upper outlet;
  (m) conduit means for receiving fluid from said second fractionator lower outlet and introducing said fluid into said third fractionator inlet;
  (n) conduit means for transferring fluid from said third fractionator lower outlet into said first fractionator inlet; and
  (o) means for recovering product from said third fractionator upper outlet.

7. An improved fixed-bed processing system comprising:
  (a) first fractionator means adapted to separate a feed stream into a lower-boiling overhead fraction and a higher-boiling bottoms fraction, said first fractionator means provided with a first fractionator inlet for introducing feed into said first fractionator means, a first fractionator lower outlet for withdrawing said bottoms fraction from the lower portion of said first fractionator means and a first fractionator upper outlet for withdrawing said overhead fraction from the upper portion of said first fractionator means;
  (b) a plurality of reactors each adapted to contain catalyst;
  (c) distribution means for connecting said reactors is a series to permit each of said reactors to occupy any position from first to last within said series and to permit any of said reactors to be isolated from said series for regeneration of the catalyst therein, said distribution means comprising conduit means extending from each of said reactors to all other reactors in said system includable in said series, said conduit means having a valved connection to each of said other reactors;
  (d) reactor inlet means for introducing charge material to the reactor first in said series;
  (e) conduit means for receiving said overhead fraction and introducing said overhead fraction into said reactor inlet means;
  (f) reactor outlet means for recovering effluent from the reactor last in said series;
  (g) conduit and valve means for introducing catalyst regeneration fluid to each reactor;
  (h) conduit and valve means for withdrawing said fluid therefrom;
  (i) HCl stripper means adapted to remove HCl from said effluent, said stripper being provided with a stripper inlet, an HCl inlet, and a stripper outlet;
  (j) conduit means for receiving said effluent from said reactor outlet and introducing said effluent into said stripper inlet;
  (k) conduit means for transferring HCl from said HCl outlet into said reactor inlet means;
  (l) second fractionator means adapted to separate compounds into a lower-boiling overhead fraction and a higher-boiling bottoms fraction, said second fractionator provided with a second fractionator inlet, a second fractionator lower outlet, and a second fractionator upper outlet;
  (m) conduit means for receiving fluid from said stripper outlet and introducing said fluid into said second fractionator inlet;
  (n) conduit means for transferring fluid from said second fractionator lower outlet into said first fractionator inlet; and
  (o) means for recovering product from said second fractionator upper outlet.

References Cited
UNITED STATES PATENTS

| | | | |
|---|---|---|---|
| 1,701,988 | 2/1929 | Torrey et al. | 203—84 |
| 2,310,244 | 2/1943 | Lassiat | 23—288 |
| 2,474,014 | 6/1949 | Seebold | 252—416 |

JAMES H. TAYMAN, Jr., *Primary Examiner.*